(12) United States Patent
Natarajan et al.

(10) Patent No.: US 9,021,573 B2
(45) Date of Patent: *Apr. 28, 2015

(54) CONTROL OF SECURITY APPLICATION IN A LAN FROM OUTSIDE THE LAN

(71) Applicants: Ramachandran Natarajan, Cupertino, CA (US); Suhas S. Patil, Cupertino, CA (US)

(72) Inventors: Ramachandran Natarajan, Cupertino, CA (US); Suhas S. Patil, Cupertino, CA (US)

(73) Assignee: Cradle Technologies, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/677,812

(22) Filed: Nov. 15, 2012

(65) Prior Publication Data

US 2013/0074173 A1 Mar. 21, 2013

Related U.S. Application Data

(63) Continuation of application No. 12/774,626, filed on May 5, 2010, now Pat. No. 8,380,863.

(51) Int. Cl.
*H04L 12/46* (2006.01)
*H04L 29/12* (2006.01)
(Continued)

(52) U.S. Cl.
CPC .......... *H04L 61/256* (2013.01); *H04L 12/2461* (2013.01); *H04L 12/4641* (2013.01);
(Continued)

(58) Field of Classification Search
CPC . G06F 21/00; H04L 12/4633; H04L 29/1249; H04L 29/12066; H04L 41/0273; H04L 61/256; H04L 61/1511; H04L 61/2575; H04L 63/029; H04L 63/0272; H04L 63/0428; H04L 67/104

USPC .............. 726/2–3, 6, 11–12, 14–15; 713/150, 713/153; 709/217–220, 222–224, 227, 230, 709/238

See application file for complete search history.

(56) References Cited

U.S. PATENT DOCUMENTS 6,088,451 A 7/2000 He et al.
6,157,649 A 12/2000 Peirce et al.
(Continued)

FOREIGN PATENT DOCUMENTS

WO WO-02/06963 1/2002
WO WO-2009/029774 3/2009

OTHER PUBLICATIONS

"International Search Report and Written Opinion of the International Searching Authority Dated Feb. 3, 2011", International Application No. PCT/US2010/039535.

*Primary Examiner* — Joseph P Hirl
*Assistant Examiner* — Kalish Bell
(74) *Attorney, Agent, or Firm* — Blakely Sokoloff Taylor & Zafman LLP

(57) ABSTRACT

A method and a system are disclosed that enable an address at the edge router to be used to establish a multi-pipe virtual private network (MVPN) connecting controllers to multiple web enabled end user devices (EUDs) inside a security protected local area network (LAN). The EUDs connect to a central server (CS) outside the LAN during configuration establishing registration and identity (ID) for each EUD. Once the EUDs establish connection from inside the LAN, the CS is enabled to communicate with the EUDs using the address and ID provided during registration. The CS then acts as a facilitator establishing secure VPN connection between controllers in the cloud and the EUDs inside the LAN. CS further acts as a pass through for those LANs that do not allow direct connections to controllers outside the LAN. The CS continues to monitor the health of the overall system once connectivity is established.

5 Claims, 4 Drawing Sheets

(51) Int. Cl.
*G06F 21/00* (2013.01)
*H04L 12/24* (2006.01)
*H04L 29/06* (2006.01)

(52) U.S. Cl.
CPC ....... *H04L29/12066* (2013.01); *H04L 29/1249* (2013.01); *H04L 61/1511* (2013.01); *H04L 63/0272* (2013.01); *H04L 63/029* (2013.01)

(56) References Cited

U.S. PATENT DOCUMENTS

| | | | |
|---|---|---|---|
| 6,381,700 B1 | 4/2002 | Yoshida | |
| 6,393,569 B1 | 5/2002 | Orenshteyn | |
| 7,155,616 B1 | 12/2006 | Hamlin | |
| 7,186,271 B2 | 3/2007 | Horikiri et al. | |
| 7,203,736 B1 | 4/2007 | Burnett et al. | |
| 7,290,288 B2 | 10/2007 | Gregg et al. | |
| 7,380,279 B2 | 5/2008 | Prokupets et al. | |
| 7,448,076 B2 | 11/2008 | Ocepek et al. | |
| 7,730,534 B2 | 6/2010 | Renkis | |
| 7,895,334 B1 | 2/2011 | Tu et al. | |
| 8,010,631 B2 | 8/2011 | Brailean et al. | |
| 8,064,080 B2 | 11/2011 | Kawai | |
| 2002/0138847 A1 | 9/2002 | Abrams et al. | |
| 2002/0161904 A1 | 10/2002 | Tredoux et al. | |
| 2002/0169878 A1 | 11/2002 | Orenshteyn | |
| 2002/0184398 A1 | 12/2002 | Orenshteyn | |
| 2003/0023874 A1 | 1/2003 | Prokupets et al. | |
| 2003/0191848 A1 | 10/2003 | Hesselink et al. | |
| 2004/0054926 A1 | 3/2004 | Ocepek et al. | |
| 2005/0114711 A1 | 5/2005 | Hesselink et al. | |
| 2005/0120082 A1 | 6/2005 | Hesselink et al. | |
| 2005/0120223 A1 | 6/2005 | Kiwimagi et al. | |
| 2005/0120240 A1 | 6/2005 | Kiwimagi et al. | |
| 2005/0193103 A1 | 9/2005 | Drabik | |
| 2005/0268334 A1 | 12/2005 | Hesselink et al. | |
| 2005/0273850 A1 | 12/2005 | Freund | |
| 2006/0056397 A1 | 3/2006 | Aizu et al. | |
| 2006/0075065 A1 | 4/2006 | Renkis | |
| 2006/0158336 A1 | 7/2006 | Nourbakhsh et al. | |
| 2006/0277314 A1 | 12/2006 | Hesselink et al. | |
| 2007/0157303 A1* | 7/2007 | Pankratov | 726/11 |
| 2007/0162748 A1 | 7/2007 | Okayama et al. | |
| 2007/0245409 A1 | 10/2007 | Harris et al. | |
| 2008/0066168 A1 | 3/2008 | Gregg et al. | |
| 2008/0083018 A1 | 4/2008 | Prokupets et al. | |
| 2008/0205419 A1 | 8/2008 | Shin et al. | |
| 2008/0209034 A1 | 8/2008 | Shin et al. | |
| 2009/0066788 A1 | 3/2009 | Baum et al. | |
| 2009/0066789 A1 | 3/2009 | Baum et al. | |
| 2009/0070436 A1 | 3/2009 | Dawes et al. | |
| 2009/0070473 A1 | 3/2009 | Baum et al. | |
| 2009/0070477 A1 | 3/2009 | Baum et al. | |
| 2009/0070681 A1 | 3/2009 | Dawes et al. | |
| 2009/0070682 A1 | 3/2009 | Dawes et al. | |
| 2009/0070692 A1 | 3/2009 | Dawes et al. | |
| 2009/0074184 A1 | 3/2009 | Baum et al. | |
| 2009/0077167 A1 | 3/2009 | Baum et al. | |
| 2009/0077623 A1 | 3/2009 | Baum et al. | |
| 2009/0077624 A1 | 3/2009 | Baum et al. | |
| 2009/0106394 A1* | 4/2009 | Lin et al. | 709/218 |
| 2009/0134998 A1 | 5/2009 | Baum et al. | |
| 2009/0138600 A1 | 5/2009 | Baum et al. | |
| 2009/0138958 A1 | 5/2009 | Baum et al. | |
| 2009/0165114 A1 | 6/2009 | Baum et al. | |
| 2009/0210934 A1* | 8/2009 | Innes | 726/7 |
| 2009/0225164 A1 | 9/2009 | Renkis | |
| 2009/0271002 A1 | 10/2009 | Asofsky | |
| 2010/0023865 A1 | 1/2010 | Fulker et al. | |
| 2010/0217837 A1 | 8/2010 | Ansari et al. | |
| 2010/0245107 A1 | 9/2010 | Fulker et al. | |
| 2010/0309318 A1 | 12/2010 | Bund | |
| 2010/0325730 A1* | 12/2010 | Cyprus et al. | 726/25 |
| 2011/0074570 A1 | 3/2011 | Feldstein et al. | |
| 2011/0102142 A1 | 5/2011 | Widger et al. | |
| 2011/0102171 A1 | 5/2011 | Raji et al. | |
| 2011/0128378 A1 | 6/2011 | Raji | |
| 2011/0187858 A1 | 8/2011 | Wang et al. | |
| 2011/0187864 A1 | 8/2011 | Snider | |
| 2012/0066608 A1 | 3/2012 | Sundermeyer et al. | |
| 2012/0066632 A1 | 3/2012 | Sundermeyer et al. | |
| 2012/0188072 A1 | 7/2012 | Dawes et al. | |

* cited by examiner

CONTROL OF SECURITY APPLICATION IN A LAN FROM OUTSIDE THE LAN

CROSS-REFERENCE TO RELATED APPLICATIONS

This application is a continuation of U.S. patent application Ser. No. 12/774,626 filed May 5, 2010.

BACKGROUND OF THE INVENTION

1. Field of the Invention

The invention relates to controlling and monitoring multiple processors and web enabled devices of a network that are within a secure LAN from outside the LAN without degrading the security at the edge and specifically to connecting to security cameras and security devices inside a secure LAN for monitoring and control from outside the LAN or from within another secure LAN.

2. Prior Art

In the current climate of competition and uncertainty, and because of the critical role computers and networked devices play and information they keep, it has become essential for all enterprises to have physical security covering the enterprise and network security covering internal network access and its periphery. Large enterprises tend to have their own internal security groups, which monitor network access within the company and also monitor the surrounding network continuously. Having internal security with an in-house security team is costly and this level of investment is not possible for smaller enterprises. These enterprises hence have to depend on an external security-monitoring group or company to handle the physical security within the enterprise through network connected security devices. Such groups have to have the ability to access, configure and monitor the networked devices and access monitoring devices installed within the network perimeter of the enterprise used to monitor the physical security of the LANs. Besides computers the networked devices on the networked end user devices (EUDs) include wide variety of devices such as media servers, monitoring and control devices for energy management and devices for physical security monitoring such as IP cameras, network video recorders and access control devices.

Typically, the security monitoring companies handle security for multiple enterprises simultaneously. The monitoring of the physical security devices in these cases is done via the internet. Hence the security companies require access to any secure local area networks (LANs) that the enterprise has, and the ability to connect to the end customer specific security devices or end user devices (EUD), installed within the enterprise, for the purpose of monitoring and control. Secure LANs typically control access to the units and devices in the LAN from outside with firewalls and other network security software to protect the connected devices and systems. In order to access devices for control from outside the edge router, that is the interface between the secure LAN and the internet, reconfiguration of the edge device is essential. This has multiple issues during installation and configuration of the end user devices. Firstly, there is a need to obtain an address for each EUD. If a static address is to be used, then there is the need to obtain the static internet protocol (IP) address and an associated fully qualified domain name (FQDN). If a dynamic IP address is to be used, it is obtained from the internet service provider (ISP), and in addition a dynamic domain name server or System (DNS) address is also needed. Secondly, there is a need to enable connection to each of the EUDs. This requires opening certain/multiple ports on the edge routers facing the internet and forwarding these ports to the end customer devices. For example, if a web server or processor is running on the end-customer device, then port 80 of the router facing the internet should be forwarded to the device.

In certain high security systems, secure one to one connections are established between a device outside the secure LAN to a device within the LAN by establishing a secure data pipe between the two device entities. These pipes called virtual private networks (VPNs) are able to provide connections between individual devices with high security. The typical use of these VPNs is for secure communication purposes. The current VPNs still require individual connection through available ports on the edge routers and have the same limitations and impact on LAN.

There are several issues associated with port forwarding in networks to achieve connectivity. Multiple devices cannot use the same IP address and therefore multiple IP addresses have to be acquired from the ISP. For example, if two web servers based EUDs are located inside the customer premises, then only one of them can be visible using the default hypertext transfer protocol (HTTP) via the port. The second web server has to run on a different port and thus cannot be accessed from a web client without modifying the uniform resource locator (URL), i.e, adding another port to the URL. Opening ports on the routers is a security risk that is difficult for the enterprise to accept-open ports allow hackers a chance to get in without being stopped by the firewall security protection. This means the end customer devices should be able to run firewalls to prevent hackers from entering the system. This makes the end customer devices more expensive and even then the security provided is not strong. Typically if the router administration is handled by the ISP or a network administrator, they may not be willing or available for installation work without additional payment, and hence additional cost. Opening ports needs technically qualified people who know networking protocols (what type of port to open etc.) and the router configuration details. Since connection using port forwarding is a one to one connection, in order to connect using port forwarding, web server based end customer devices have to be installed directly behind the edge router facing the internet. Hence there is a limit to the number of end customer devices that can be connected, as port availability is limited on the edge routers. If a customer already has a complex network topology with multiple routers in the network, then installation and configuration of the end customer devices in the system are very complex using the port forwarding method.

FIG. 1 is a block diagram 100 of a current installation of end customer devices 104a, 104b, 104c, within a secure LAN 101. The secure LAN 101 has an edge router 103 providing connectivity to the internet 110. Three end customer devices with processors 104a, 104b, 104c are inside the secure LAN 101 perimeter. A monitor controller 115 outside the secure LAN 101 is used to configure, monitor and control these secure devices 104a, 104b, 104c. In order for the monitor controller to connect to the end customer devices (EUDs) 104a, 104b, 104c inside the secure LAN 101 via the internet 110 it is necessary for each EUD to be connected to a forwarded port, device 104a connected via the forwarded port 102a of the edge router, device 104b connected via the forwarded port 102b, device 104c connected via forwarded port 102c, on the edge router 103. This port forwarding eliminates the checking and access control provided by the firewall 107 at the edge router 103 creating security risk to the secure LAN 101. Further in order for the monitor controller to access the respective forwarded ports 102a, 102b and 102c individual URLs enabling connection 111a, 111b, 111c, through the internet 110 are necessary. Hence these connections are considered as independent connections 111a, 111b, 111c respectively through the internet 110. As the number of end customer devices increase and multiple LANs of an enterprise are covered this type of installation becomes very complicated and resource intensive as shown. It also increases the security risk to the enterprise.

Hence it would be advantageous in any network to have a different and easier way to install and configure the EUDs and provide access to them via the edge router for monitoring and control from outside the LAN through the internet. It would be of additional advantage if multiple devices can be accessed for monitoring and control simultaneously without tying up additional ports on the edge router and enabling independent URLs for establishing the connections. It would be further advantageous to eliminate the need for port forwarding at the edge routers to eliminate the security concerns of the enterprise. It would be further advantageous to have the capability to continuously monitor the system performance and health once connections are established.

BRIEF DESCRIPTION OF THE DRAWINGS

FIG. 2A is a block diagram of the current invention using a central server enabling connection of EUDs inside a secure LAN to monitor controller inside another secure LAN.

DETAILED DESCRIPTION OF THE PREFERRED EMBODIMENTS

Figure 1:
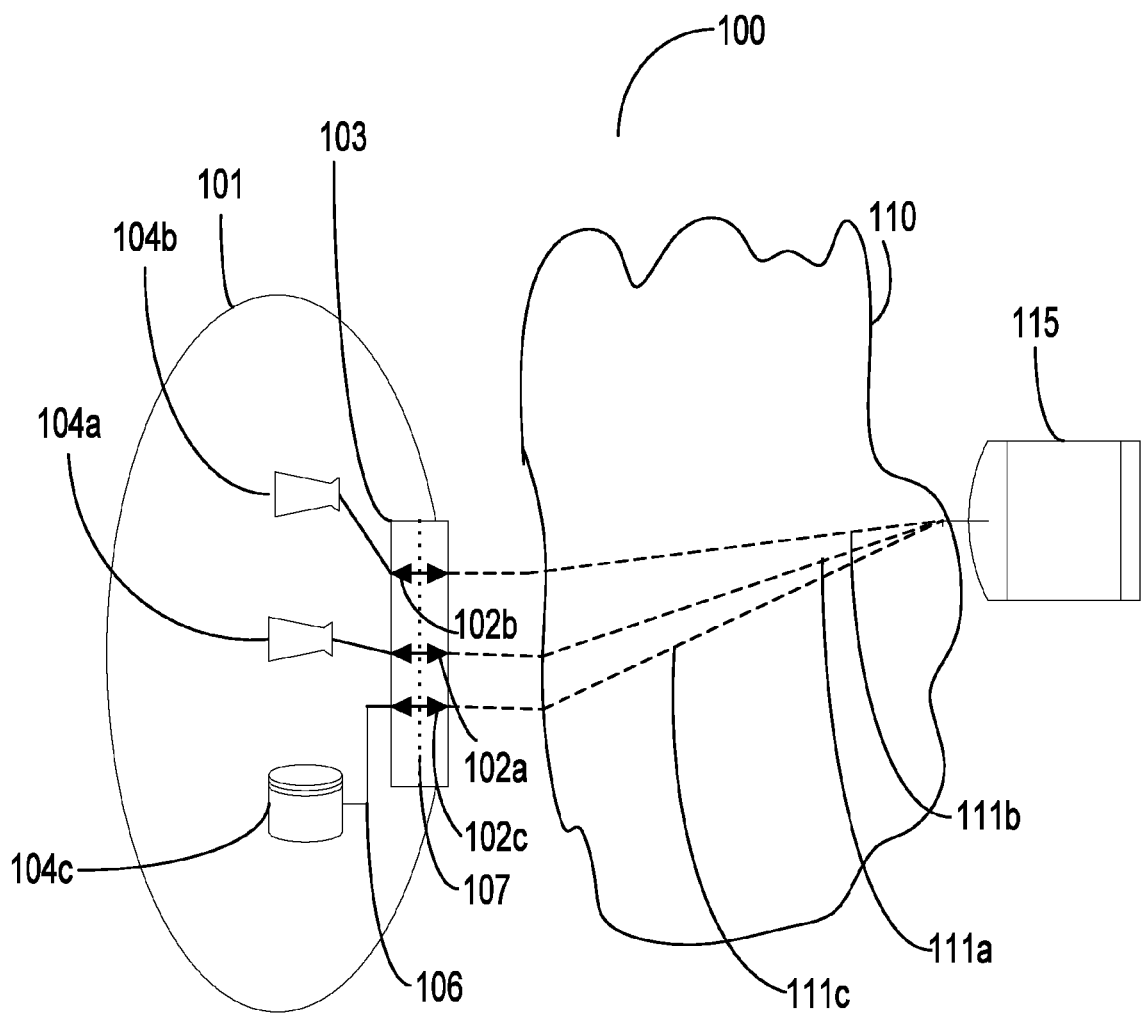
FIG. 1 is a block diagram of a typical prior art implementation connecting processors inside a secure LAN to a monitor and controller outside using port forwarding at the edge router.

A method and a system are disclosed that enable an address at the edge router to be used to establish a multi-pipe virtual private network (MVPN) connecting controllers to multiple web enabled end user devices (EUDs) inside a security protected local area network (LAN). The EUDs connect to a central server (CS) outside the LAN during configuration establishing registration and identity (ID) for each EUD. Once the EUDs establish connection from inside the LAN, the CS is enabled to communicate with the EUDs using the address and ID provided during registration. The CS then acts as a facilitator establishing secure VPN connection between controllers in the cloud and the EUDs inside the LAN. CS further acts as a pass through for those LANs that do not allow direct connections to controllers outside the LAN. The CS continues to monitor the health of the overall system once connectivity is established.

This connection can be established as a secure tunnel, in the form of MVPN with the capability to handle multiple connections from the EUDs to the controller simultaneously, it uses only a single address at the edge router of the LAN. This MVPN due to its secure nature is able to provide the high security that is needed for the data being transmitted through the cloud while allowing connection to multiple EUDs within the LAN. The CS can also act as a pass through for those LANs that do not allow direct connections from within the LAN to controllers outside the LAN. Also, multiple Central Servers could be deployed for scalability.

There are a number of advantages to using a central server that is a dedicated and secure server to mediate establishment of the secure connection or MVPN connection. Firstly, the use of the central server removes the need for port forwarding—multiple EUDs can be installed behind routers and each can be accessed securely and independently from the internet. This is due to the established registration within IDs that can be used to access them individually. Secondly, the central server by being a dedicated and secure central server, eliminates a lot of the security concerns of the users of the systems during the establishment of the connections. Thirdly, the central server acts as an intermediary for setting up secure pipe connections between monitor controllers and EUDs within a secure LAN in the form of MVPN. These connections protect the data during transport through the cloud from and to the controller and EUDs. Where the connections are not allowed the central server acts as a relay server between the monitor controller and EUDs to allow secure dual MVPN connection for monitoring and control without reconfiguration of the router. Fourthly, the central server acts as a dedicated identifying server (IDS) for the system where the IDS may also be enabled as a dedicated domain name system (DNS) server eliminating the need for the EUDs to get dynamic DNS names and internet protocol (IP) addresses from external sources when needed. Fifthly, once the secure connections are established, the central server is freed to oversee the system health of the security monitoring and sends information via email/short message service (SMS) to inform the physical security-management company of any failures of EUDs or storage devices so that any lost connections can be reestablished fast and repairs can be undertaken speedily. Lastly, the central server is a back up device that can help the system recover from any crashes.

Figure 2:
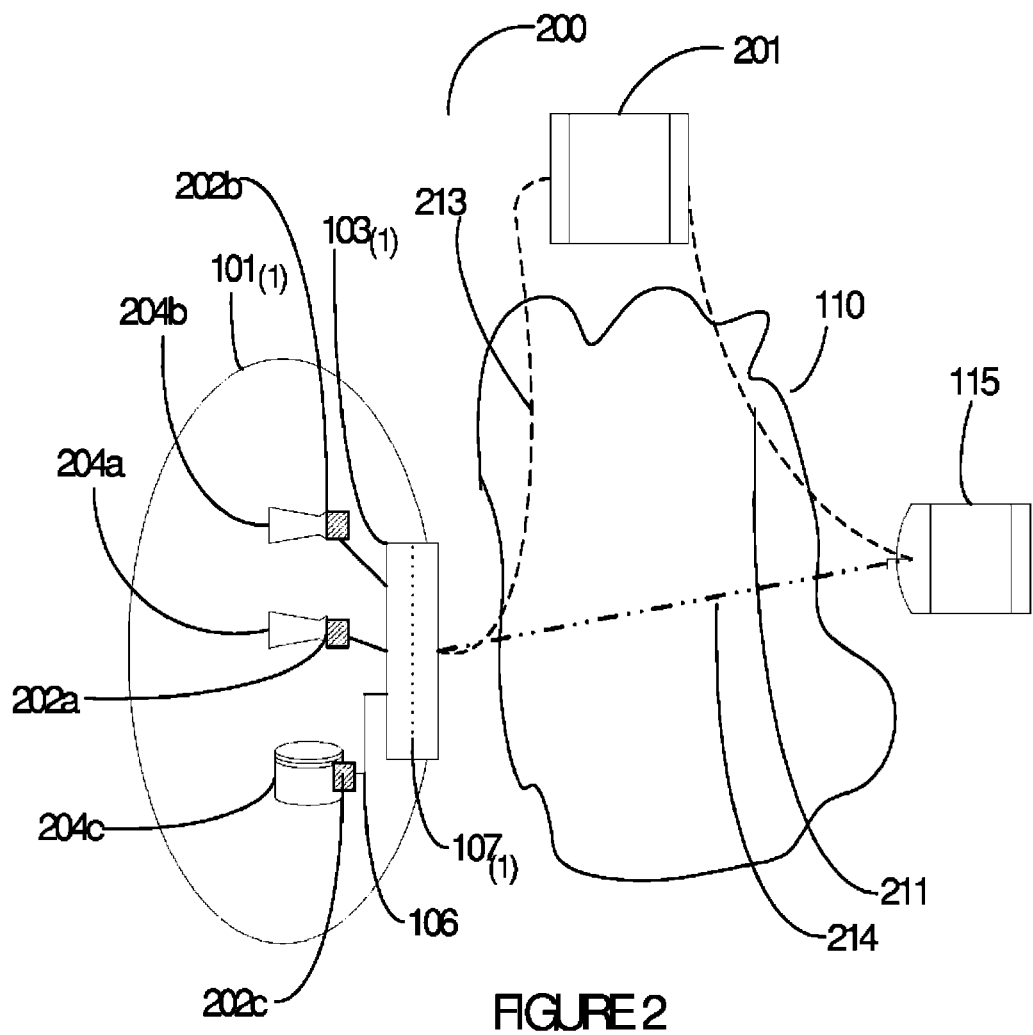
FIG. 2 is a block diagram of the current invention using a central server as facilitator to enable connection without port forwarding.
Figure 2:
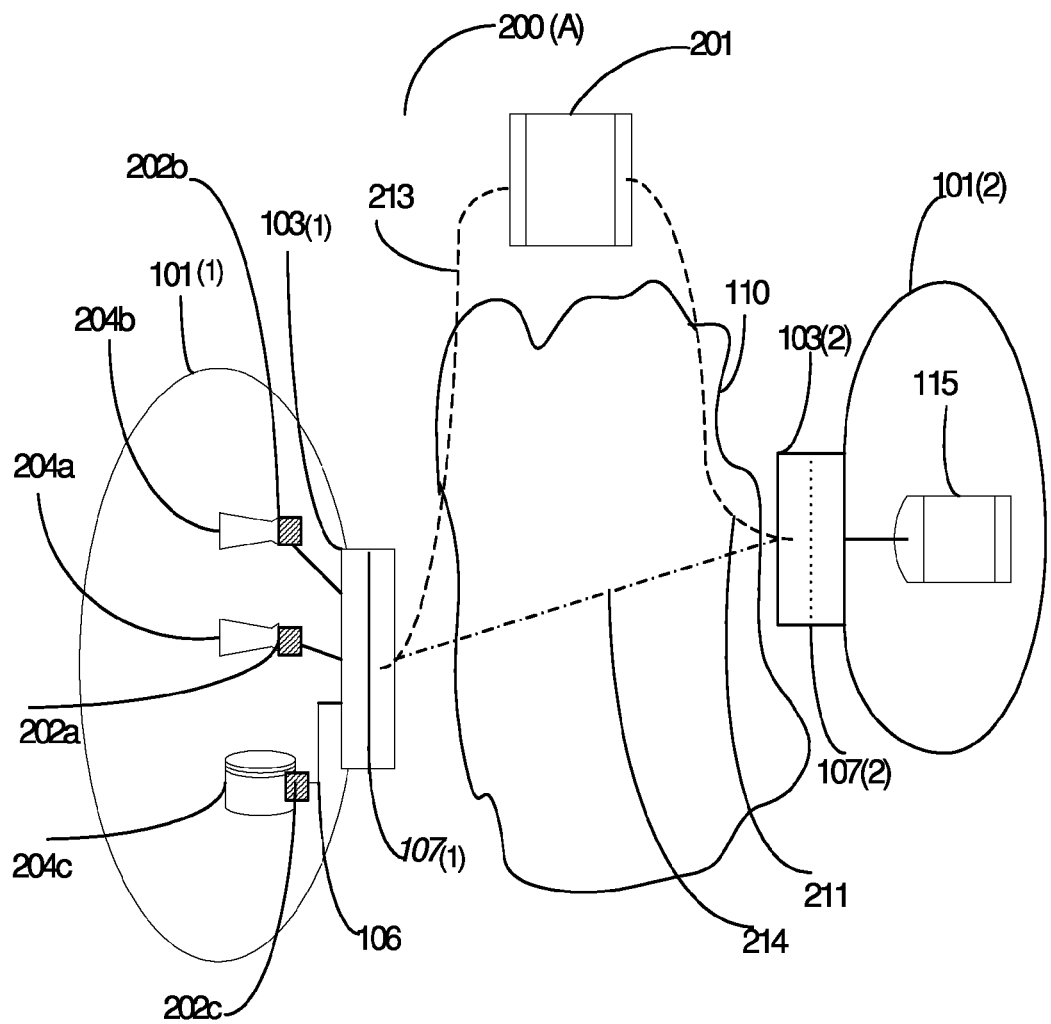

FIG. 2 is an exemplary and non-limiting block diagram 200 of the invention. According to the principles of the invention a secure dedicated central server 201, installed outside the secure LAN 101(1) and equipped with dedicated software, enables it to communicate with the EUDs 204a, 204b, 204c, and retain the connection once an initial connection is established. The central server is also enabled as a IDS to provide the necessary identification and any domain and IP addresses resolution to the EUDs (S302). This eliminates the need for the EUDs 204a, 204b, 204c, to acquire from outside sources, static IP addresses or Dynamic DNS names making the system more secure. The disclosed system uses network address translation (NAT) traversal to enable and retain connectivity between the end user devices 204a, or 204b, or 204c, and the central server 201. For this purpose, the EUDs 204a, 204b, 204c themselves have proprietary NAT traversal modules (NATTM), 202a, 202b, 202c, embedded in them. In a typical installation and configuration sequence, the NATTM 202a, 202b, 202c, enable connection of the EUDs 204a, 204b, 204c, within the LAN 101(1) to the dedicated central server 201 directly, through the edge router 103(1) with the fire wall 107(1) and the internet 110. These EUDs 204a, 204b, 204c, also register with the central server 201 during configuration to establish a permanent connection. The registration with the central server 201 includes providing the central server 201 information on the identity (ID) of each of the EUDs, 204a, 204b, 204c, the type of NAT traversal configuration at the edge router 103(1), and the address of the EUDs 204a, 204b, 204c. Once the external connection 213 with registration is initiated and established by the EUDs 204a, 204b, 204c, to the central server 201, the connection 213 is considered secure. Hence the central server 201 is able to maintain the connection 213 and communicate with the EUDs 204a, 204b, 204c, through the edge router 103(1) with the firewall 107(1) enabled. Once this external connection to the central server 201 is established, the monitor controller 115 can connect to the central server via the internet connection 211 and provide the monitoring and control functions for the EUDs 204a, 204b, 204c. The central server now acts as a facilitator or mediator to establish the direct secure tunnel or MVPN 214, between the controller 115 and the EUDs 204a, 204b and 204c.

Since the connections between the central server 201 and the web enabled devices within the LAN 101(1), as well as the monitor controller 115 are permanent connections with registration for security, even after the establishment of the secure tunnel or MVPN 214, it enables connection of other such systems in the same LAN and other LANS. The CS 201 is also able to monitor the health of the systems so connected. The permanent connection allows the central server 201 to identify system problems immediately as they happen and take remedial action or inform the administrator for manual action. The central server 201 also acts as a backup storage for security data for the systems it is connected to as it has established permanent secure connection to the devices.

If the monitor controller 115 is within a second secure LAN 101(2) the procedure to enable connection of the monitor controller 115 to the central server is through an edge router 103(2) with firewall 107(2) of the second LAN 101(2) and the internet 110. FIG. 2A shows the block diagram of such a system. In this case the finally established secure tunnel or MVPN 214 will have to have its ends in the separate LANs 101(1) and 101(2). To enable this, the secure server connects on one side to the web enabled security devices and on the other to the monitor controller in a secure fashion. Both the web enabled device and the monitor controller have to complete registration and receive individual IDs from the CS before direct secure MVPN 214 connection can be established through firewalls of the respective LANs 101(1) and 101(2).

In the special case where both EUDs and the monitor controller are behind symmetric NATs then the punch through connection may not work and the connection has to be continued through the central server 201. That is, the central server transfers data from the EUDs 204a, 204b, 204c, to the monitor controller 115 and transfers control and support data back to the EUD 204a, 204b, 204c, from monitor controller 115.

In other cases of connections with non-symmetric NAT implementations, once the initial connections and registration have been established, the central server 201 can in most cases act as a facilitator, to enable direct MVPN connection between the monitor controller 115 and the EUDs 204a, 204b, 204c. Complex NAT traversal algorithms are used to enable these secure connections using user datagram protocol (UDP) or transmission control protocol (TCP) hole punch techniques. Typically this is done by establishing the MVPN connection 214 between NAT modules on either side. One end of the secure tunnel connects to the EUDs 204a, 204b, 204c, and the other end connects to the monitoring control 115. The establishment of the MVPN connection 214 is done with the help of the mediating central server 201. Once established the MVPN connection 214 enables the monitor controller 115 to directly communicate to the EUDs 204a, 204b, 204c, without going through the central server 201. This releases the central server 201 to handle other operations as necessary.

Such an implementation of the invention enables easy and secure connection of the EUDs, 204a, 204b, 204c, within a secure LAN 101(1), to the monitor controller 115. The use of a dedicated and secure CS 201 as a facilitator to establish direct connection via UDP or TCP initiated MVPN tunnel 214 without port forwarding requirements allow the security of the secure LAN to be enhanced by use of the fire walls 107. The use of the secure server 201 as a dedicated IDS, acting where needed as a secure DNS server, further reduces the complexity of providing addresses and establishing connections to the EUDs within the secure LAN 101(1). This invention hence provides for easy installation and commissioning for monitoring and control of EUDs 204a, 204b, 204c, within secure LAN 101(1) without compromising the security of the secure LAN 101(1).

Figure 3:
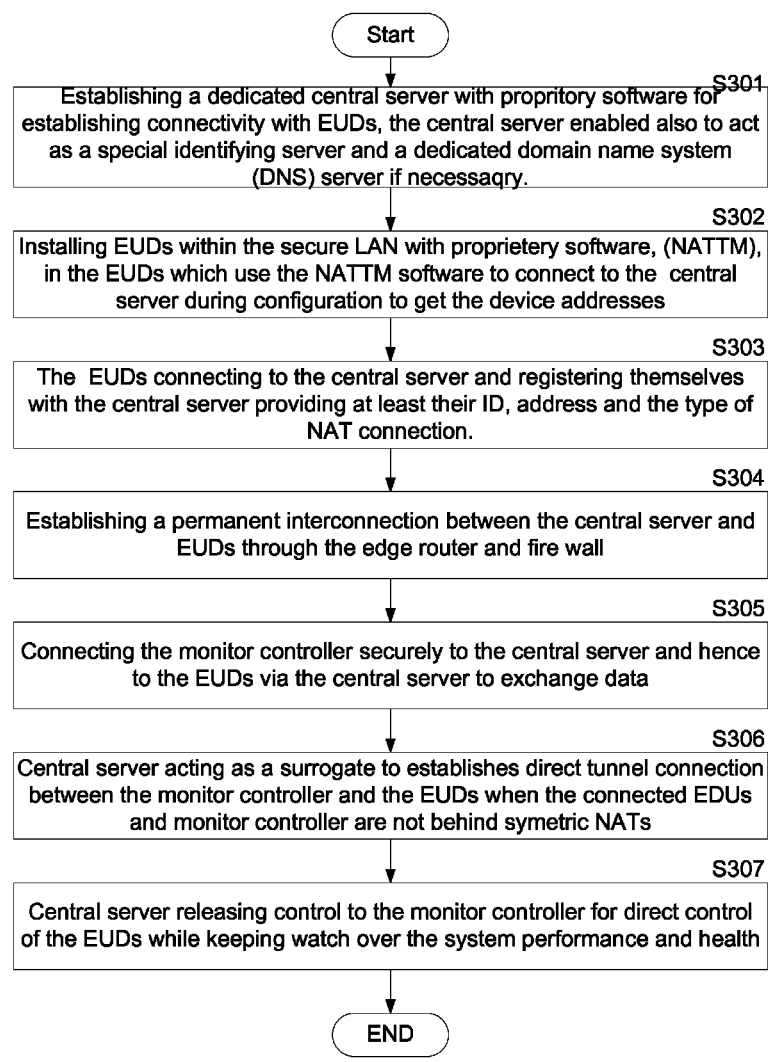
FIG. 3 is a flowchart of the sequence of operations to enable connection between the EUDs inside a secure LAN and the monitor controller outside that secure LAN, as per the invention.

FIG. 3, comprising of S301 to S307, is an exemplary and non-limiting flowchart 300 of the establishment of connection between the monitor controller 115 and the EUD 204a, 204b, 204c, discussed below in more detail.

In S301—Installing a computing unit configured as a server outside the secure LAN 101(1), with software necessary to establish connectivity to EUDs 204a, 204b, 204c, that are inside the secure LAN 101(1). Server is made a secure, dedicated central server 201 with installed proprietary software. This central server 201 is enabled also to act as an IDS to provide the identification to the EUDs 204a, 204b, 204c, as well as a DNS server when and if needed providing the necessary addresses to the EUDs 204a, 204b, 204c.

In S302—Installing required number of EUDs 204a, 204b, 204c, with specialized and proprietary software, the NATTM software 202a, 202b, 202c, within the secure LAN 101(1). The NATTM software 202a, 202b, 202c, enable the EUDs 204a, 204b, 204c, to connect to the central server 201 outside the secure LAN 101(1) through the firewall 107(1) enabled edge router 103(1).

In S303—During installation and configuration of the EUDs 204a, 204b, 204c, connecting them to the central server 201 to register themselves with the central server by supplying the central server with their id, their address in the LAN and the type of NAT traversal configuration at the edge router 103(1).

In S304—Enabling the central server to retain the connection with the EUDs 204a, 204b, 204c even through the firewall 107(1) enabled edge router 103(1), using the registration information available. Since the original connection to the central server was initiated by the EUDs 204a, 204b, 204c, within the secure LAN the connection is considered secure and trust worthy by the firewall.

In S305—Allowing the monitor controller 115 to connect securely to the central server 201, the central server 201 enabled to facilitate pass through connection to and from the EUDs 204a, 204b, 204c, to the monitor controller 115 to exchange data. The monitor controller 115 thereby further enabled to continuously provide security monitoring of the EUDs 204a, 204b, 204c, to provide security control to the enterprise.

In S306—Acting as a facilitator the central server 201 enables formation of a UDP tunnel or a TCP tunnel that is a direct secure tunnel or MVPN connection 214 between the monitor controller 115 and the EUDs 204a, 204b, 204c. The direct MVPN connection 214 is established only if the EUDs 204a, 204b, 204c and the monitor controllers 115 are not behind symmetric NATs. If the EUDs and the controller are behind symmetric NATs, formation of such peer to peer connections may not be possible.

In S307—Allowing the monitor controller 115 to oversee the physical security of the enterprise using the EUDs 204a, 204b, 204c, directly, through the MVPN connection 214 while the central server 201 takes the task of monitoring the health of the connections and security system as a whole.

Even though not specifically detailed in this disclosure, the disclosed or similar systems can be established for managing the connectivity in other applications requiring secure connections to processing systems and web enabled systems within secure LANs. It can also be used in networks having LANs with limited port availability to establish secure connection to a number of entities within the LAN using the MVPN established with the help and mediation of a secure central server to which each of the entities in the LAN are registered and have unique IDs assigned to them.

The invention disclosed hereinabove is described with respect to specific embodiments, with an example of security application, but other embodiments and applications of the invention are possible in other areas of the networking field without departing from the scope of the disclosed invention as will be known to the practitioners of the art. Any improvements and modifications of the invention that are possible without departing from the spirit of the invention are covered by the present disclosure. Furthermore implementations of the invention with different hardware, software, firmware and various combinations thereof are specifically included.

What is claimed is:

1. A secure method for connecting to web enabled devices inside a secure firewalled local area network (LAN) through a secure fire-walled edge router, without enabling port forwarding, at an interface between the secure LAN and an internet cloud, for monitoring and control of the web enabled devices within the secure LAN comprising:
   providing a secure central server outside the LAN, wherein the secure central server immediately identifies problems within the LAN and either automatically takes remedial action or informs an administrator for manual action, wherein the secure central server oversees a security monitoring health of a system of the secure central server and transmits a short message service (SMS) message to an administrator of the system in order to indicate a failure of at least one of the web enabled devices;
   providing at least one monitor and control device outside the secure LAN, wherein the secure central server is coupled to the at least one monitor and control device;
   having the web enabled devices within the LAN connecting to and registering with the secure server; and
   enabling establishment of a secure virtual pipe connection via the secure central server, for use by the at least one monitor and control device, outside the secure LAN, that is securely connected and pre-registered with the secure central server, wherein the at least one monitor and control device monitors and controls the web enabled devices inside the secure LAN.

2. The method of claim 1, wherein the secure central server is a secure domain name system server.

3. The method of claim 1, wherein the secure central server is enabled to accept connection and registration from web enabled devices within multiple secure LANs and to provide monitoring and control of connections to the web enabled devices within the multiple secure LANs from monitor and control devices securely connected and pre-registered with the secure central server.

4. A system for securely accessing web enabled devices in a secure firewalled local area network (LAN) from outside the secure LAN, through a secure firewalled edge router at an interface of the secure LAN and an internet cloud, the system comprising:
   a secure central server outside the secure LAN, with proprietary software to act as a secure dedicated server;
   at least one monitoring and control unit outside the secure LAN and registered with and securely linked to the secure server;
   at least one web enabled device within the secure LAN enabled to connect to the secure central server through the secure firewalled edge router at the interface of the secure LAN and the internet cloud, to securely connect to and register with the secure LAN to establish a virtual pipe, wherein the at least one monitoring and control unit is enabled to connect to and provide monitoring and control of the at least one web enabled device within the secure LAN, wherein the secure central server oversees a security monitoring health of the system and transmits a short message service (SMS) message to an administrator of the system in order to indicate a failure of at least one of the web enabled devices.

5. The system of claim 4, wherein the secure central server transmits an email to indicate a failure of at least one of the web enabled devices.

\* \* \* \* \*